(12) United States Patent
Duan et al.

(10) Patent No.: US 8,258,651 B2
(45) Date of Patent: Sep. 4, 2012

(54) METHODS AND CIRCUITS FOR CONTROLLING A BATTERY DISCONNECT SWITCH

(75) Inventors: Huihui Duan, Fort Wayne, IN (US); Gregory A. Jean-Baptiste, Fort Wayne, IN (US); Zhengming Wang, Greenwood, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 344 days.

(21) Appl. No.: 12/714,619

(22) Filed: Mar. 1, 2010
(Under 37 CFR 1.47)

(65) Prior Publication Data
US 2011/0210605 A1    Sep. 1, 2011

(51) Int. Cl.
*B60Q 1/00*    (2006.01)

(52) U.S. Cl. .................................... 307/10.7; 340/455

(58) Field of Classification Search ................... 340/455; 307/10.7, 10.1
See application file for complete search history.

(56) References Cited

U.S. PATENT DOCUMENTS

| | | |
|---|---|---|
| D299,822 S | 2/1989 | Constable |
| 5,578,391 A | 11/1996 | Meyers |
| 5,689,209 A | 11/1997 | Williams |
| D399,492 S | 10/1998 | Wirth |
| 5,825,098 A * | 10/1998 | Darby et al. ............... 307/10.1 |
| D402,633 S | 12/1998 | Wirth |
| 5,864,106 A | 1/1999 | Hartwig |
| 6,590,440 B1 | 7/2003 | Williams |
| 6,629,050 B2 | 9/2003 | Modgil |
| 6,836,094 B1 | 12/2004 | Bender |
| 7,102,494 B2 * | 9/2006 | Lesesky et al. ............ 340/431 |
| 7,768,148 B2 * | 8/2010 | Frias et al. ................. 307/10.2 |

* cited by examiner

*Primary Examiner* — Michael Rutland Wallis
(74) *Attorney, Agent, or Firm* — Jeffrey P. Calfa; Mark C. Bach

(57) ABSTRACT

Redundant power supplies and redundant channels of communication maximize the probability that a controller will trigger a battery disconnect switch to open when commanded to do so.

9 Claims, 4 Drawing Sheets

METHODS AND CIRCUITS FOR CONTROLLING A BATTERY DISCONNECT SWITCH

FIELD OF THE INVENTION

This invention relates generally to electrical systems of motor vehicles. More particularly, the invention relates to circuits that include a battery disconnect switch for disconnecting a battery or battery bank from the electrical system.

BACKGROUND OF THE INVENTION

Motor vehicles that are propelled by internal combustion engines have electrical systems that include one or more D.C. storage batteries. In order to crank the engine at starting, an ignition switch is turned to a start, or crank, position that causes the engine to be cranked by an electric starter motor. When the engine has started, the switch is released from start position to assume a run position. In start position, electric current flows from the battery, or battery bank, to an electric starter motor that cranks the engine through a set of gears. The amount of current is typically very large, and consequently, heavy electrical cable is typically employed to conduct the current without the presence of any circuit protection device to protect against a short in the cable or the starter motor.

The electrical system has other circuits that are fed from the battery, or battery bank. Those individual circuits may be protected by their own individual circuit protection devices, such as fuses or circuit breakers, but there may be no circuit protection between the battery and the circuit protection devices themselves unless a battery disconnect switch is present.

Various types of battery disconnect switches are known. One type is a mechanical switch that requires manual operation. Because it may not be feasible to access such a switch in a hazardous situation, such as after a vehicle has been involved in an accident, automatic remote control systems for operating battery disconnect switches have been developed.

When a vehicle is equipped with a passenger airbag system, a signal that calls for airbag deployment may also be used to remotely operate a battery disconnect switch. A medium or heavy truck that may have a battery disconnect switch, typically does not have an airbag system, and so the same type of control remote control that would be present in an airbag equipped vehicle would not be present in the truck.

SUMMARY OF THE INVENTION

The inventors have recognized that failure to open a battery disconnect switch that connects the battery bank with a vehicle's electrical system may in certain situations have serious negative consequences. The inventors therefore believe that it is important to minimize, and ideally reduce to zero, the probability that the switch will fail to open when commanded to do so. Failure of the switch to open may be due to no fault in the design or quality of the switch itself or the vehicle's electrical system, but rather may be due to circumstances of a particular situation, such as a crash.

The inventors therefore propose that the system for operating the battery disconnect switch employ certain features that will maximize the probability that a battery disconnect switch will open when commanded to do, even if the vehicle is not equipped with an airbag system that is intended to open the disconnect switch in the event of a crash.

These features include redundant channels of communication through which a command to open the switch is transmitted from one or more sources of the command to a controller, and redundant power supplies for the switch and the controller.

It is a general objective of the invention to provide an electrical system connected through a battery disconnect switch to a bank of one or more DC storage batteries. A battery disconnect switch controller will open the battery disconnect switch in response to a command to disconnect the battery bank from the electrical system. The system has redundant channels of communication through which the command is transmitted from one or more sources of the command to the controller.

It is another general objective of the invention to provide an electrical system connected through a battery disconnect switch to a bank of one or more DC storage batteries. A battery disconnect switch controller will open the battery disconnect switch in response to a command to disconnect the battery bank from the electrical system. The system has redundant power supplies for the switch and the controller.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
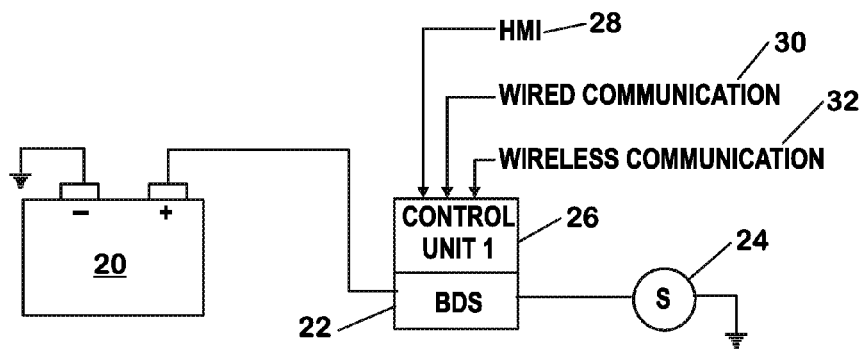
FIG. 1 is a general schematic electrical diagram of a first circuit embodying principles of the present invention.

FIG. 1 shows a circuit that comprises one or more D.C. storage batteries 20, herein sometimes referred to as a battery bank, a battery disconnect switch 22, herein sometimes referred to as a BDS, a starter motor 24 for cranking an internal combustion engine that propels a truck, and a control unit 26 for operating BDS 22. Ignition switch connection to starter motor 24 is not shown. Control unit 26 and BDS 22 are integrated with battery bank 20 on the truck chassis.

BDS 22 assumes a normally closed condition for conducting current from battery bank 20 to starter motor 24 when the ignition switch is placed in start position to crank the vehicle's engine. When control unit 26 receives a signal requesting that BDS 22 be operated to open condition, the control unit delivers a trigger signal to BDS 22 that causes BDS 22 to open and prevent current flow from battery bank 20 to starter motor 24.

Control unit 26 can receive signals from an HMI (human machine interface) 28, a wired communication channel 30, and a wireless communication channel 32. Wired and wireless communication are redundant in the disclosed embodiment, meaning that a signal request to operate BDS 22 to open is concurrently sent by both wire and wireless channels from a location that is remote from the battery bank. HMI 28 is understood to be an operator, such as a pushbutton, at the location of the switch.

Figure 2:
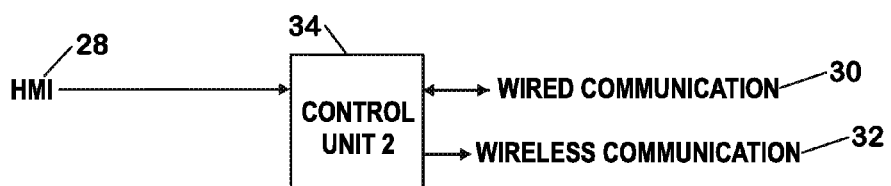
FIG. 2 is a general schematic electrical diagram of a second circuit.

FIG. 2 shows a second control unit 34 that receives signals from HMI 28 and re-transmits them to control unit 26 both by wire and wireless. Control unit 34 is remote from control unit 26 and is located, for example, in the instrumental panel of the truck cab.

Figure 3A:
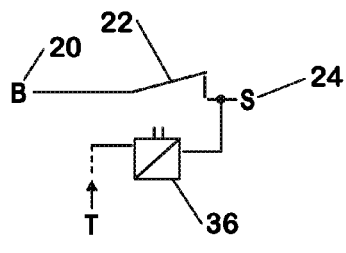
FIG. 3A is a schematic electrical diagram of a first type of battery disconnect switch that can be controlled in accordance with principles of the invention.
Figure 3B:
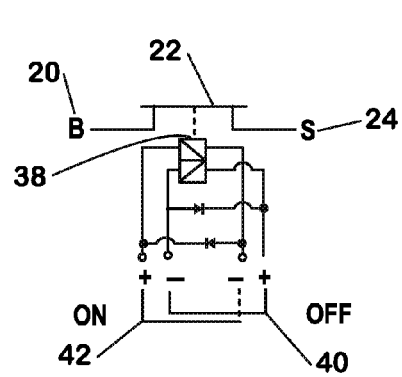
FIG. 3B is a schematic electrical diagram of a second type of battery disconnect switch that can be controlled in accordance with principles of the invention.
Figure 3C:
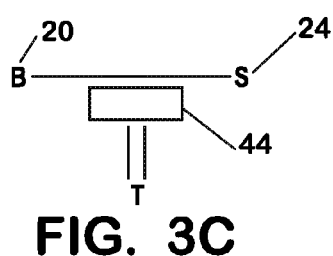
FIG. 3C is a schematic electrical diagram of a third type of battery disconnect switch that can be controlled in accordance with principles of the invention.

FIGS. 3A and 3B illustrate respective relay type BDS actuators. FIG. 3C illustrates a pyroelectric type BDS actuator. These three actuators are present in known battery disconnect switches.

In FIG. 3A, the receipt of a trigger signal T by actuator 36 causes the actuator to open BDS 22. When no trigger signal is given, BDS 22 is closed.

When a voltage whose polarity is represented by numeral 40 in FIG. 3B is applied to actuator 38, BDS 22 is closed. When a voltage of opposite polarity, as represented by numeral 42, is applied, BDS 22 is open.

When a voltage is applied to actuator 44 in FIG. 3C, BDS 22 is irreversibly opened.

Figure 4:
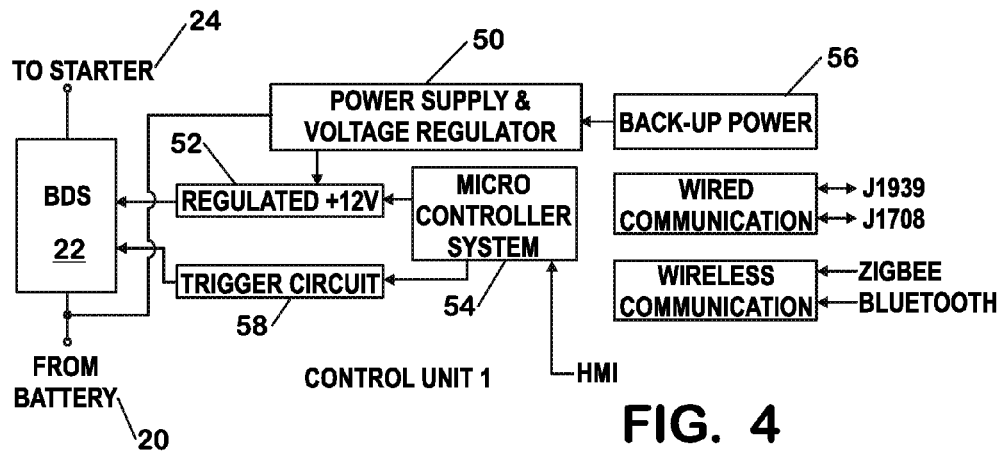
FIG. 4 is more detailed schematic diagram of a version of the circuit of FIG. 1 that is used with disconnect switch trigger circuits shown in FIGS. 5A and 5C.

FIG. 4 shows control unit 26 to comprise a power supply and voltage regulator 50 powered by battery bank 20 for developing a regulated voltage 52, such as +12 VDC, that is supplied to BDS 22 and a regulated voltage, such as +5 VDC, for operating a microcontroller system (MCS) 54. A back-up power supply 56 is provided for power supply and voltage regulator 50 in case the latter's connection to the battery bank through the vehicle electrical system is somehow lost.

MCS 54 will trigger BDS 22 via a trigger circuit 58 when MCS 54 receives a command to disconnect battery bank 20 from the vehicle electrical system. The command may come from any one or more of three sources, namely from the non-remote HMI input directly to MCS 54, from a remote initiator via wired communication, and from a remote initiator via wireless communication. Wired communication to MCS 54 is through one or more of an SAE J1939 and an SAE J1708 data link. Wireless communication can occur via one or more wireless communication protocols such as Zigbee and Bluetooth.

Figure 5A:
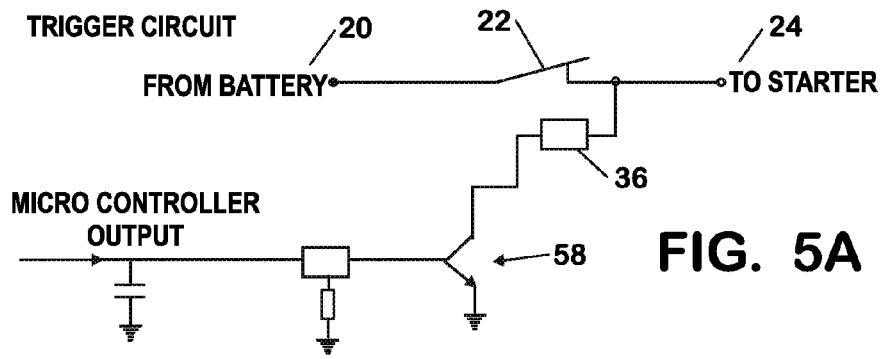
FIG. 5A is a schematic electrical diagram of a trigger circuit for use in triggering the first type of battery disconnect switch.

FIG. 5A shows how MCS 54 is associated with the actuator 36 of FIG. 3A. The trigger circuit 58 comprises a transistor driver in which the collector is connected to one terminal of actuator 36. The other terminal of actuator 36 is connected to battery bank 20 through BDS 22. When MCS 54 operates the transistor driver, actuator 36 becomes grounded through the transistor. Battery current flows through BDS 22, actuator 36 and the transistor to ground causing the actuator to open BDS 22 and automatically terminating the current flow to ground through actuator 36.

Figure 5C:
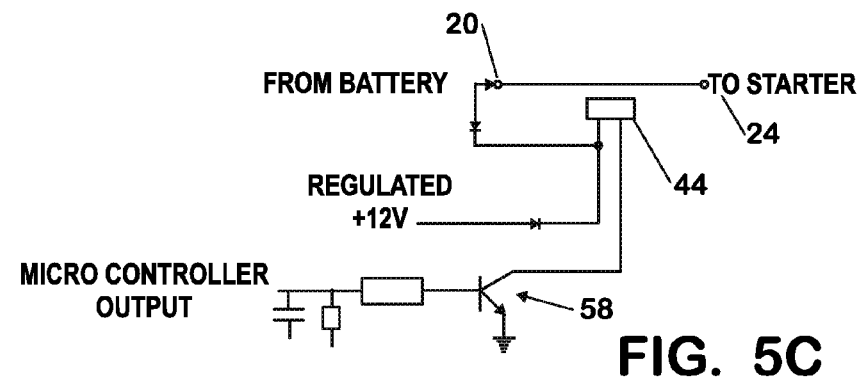
FIG. 5C is a schematic electrical diagram of a trigger circuit for use in triggering the third type of battery disconnect switch.
Figure 5B:
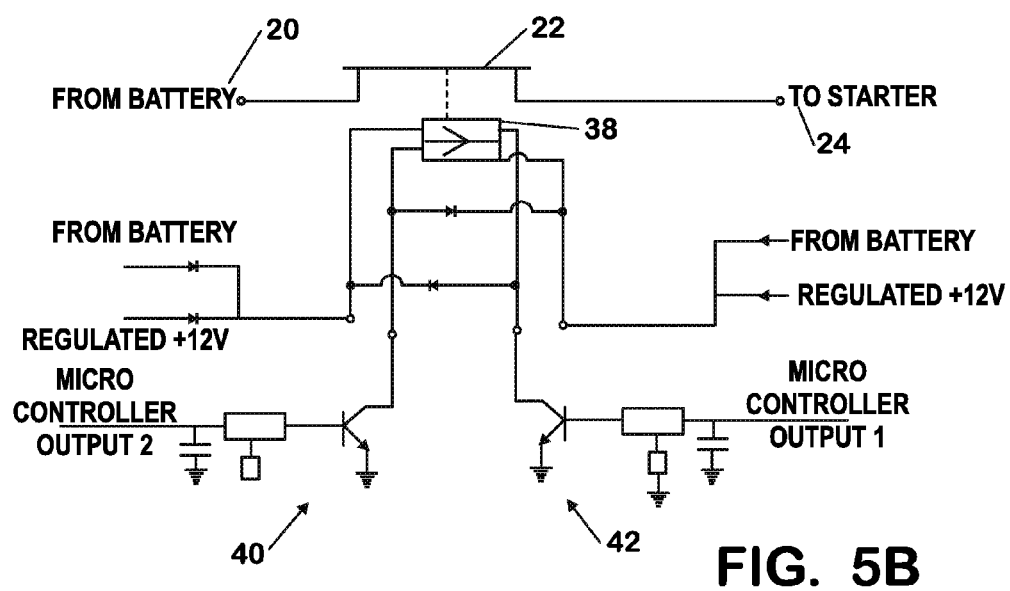
FIG. 5B is a schematic electrical diagram of a trigger circuit for use in triggering the second type of battery disconnect switch.

FIG. 5B shows how MCS 54 is associated with the actuator of FIG. 3B. Voltage is applied to actuator 38 in the polarity sense of reference numeral 40 when a first transistor driver 40A is turned on by MCS 54. Voltage is applied to actuator 38 in the polarity sense of reference numeral 42 when a second transistor driver 42A is turned on by MCS 54. Both battery voltage (20) and regulated voltage (52) are supplied to the collector of driver 40A through respective diodes D1, D2. Both battery voltage (20) and regulated voltage (52) are also supplied to the collector of driver 42A through respective diodes D3, D4. Diodes D5, D6 provide reverse polarity protection for the respective driver drivers.

FIG. 5C shows how MCS 54 is associated with the actuator of FIG. 3C. The trigger circuit 58 comprises a transistor driver in which the collector is connected to one terminal of actuator 44. The other terminal of actuator 44 is connected to battery bank voltage (20) and to regulated voltage (52) through respective diodes D1, D2.

Figure 6:
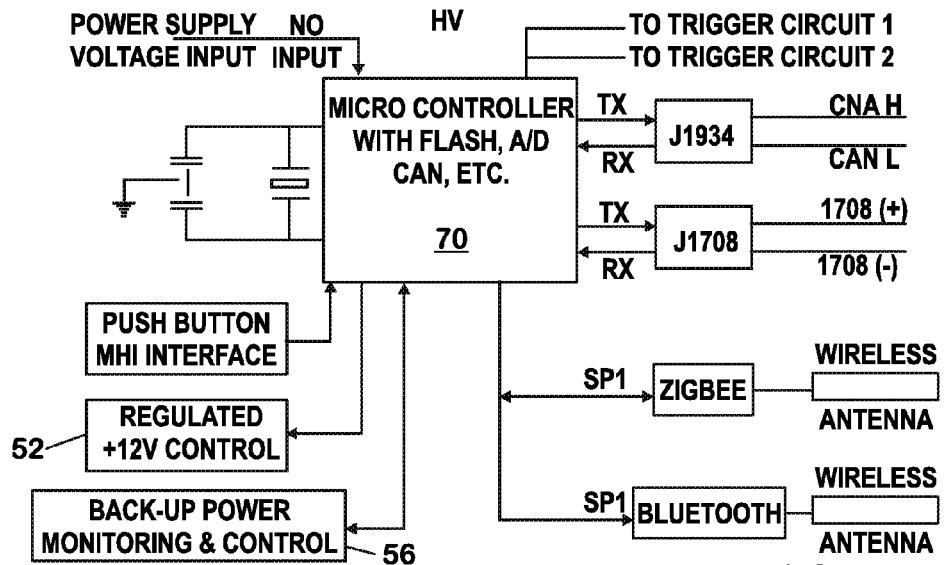
FIG. 6 is a more detailed schematic diagram of a version of the circuit of FIG. 1 that is used with the disconnect switch trigger circuit shown in FIG. 5B.

FIG. 6 shows control unit 26 to comprise a microcontroller system (MCS) 70 that is associated with the wired communication channel, the wireless communication channel, and the HMI interface.

MCS 70, like MCS 54, monitors battery bank voltage as an indicator of the healthy status of the battery bank and the associated battery cable system. Should the battery bank voltage become less than voltage needed to operate the BDS actuator, microcontroller 70 outputs regulated +12V to the trigger circuit (reference 52) to provide enough power supply for the BDS to function correctly when the microcontroller is commanded to disconnect the battery bank via the trigger circuits.

Microcontroller 70 can receive a command input from the HMI interface, from the wired communication interface, or the wireless communication interface. A J1939 communication is used as a standard wired communication interface. A J1708 is optionally available for a vehicle that has no J1939 network.

For redundancy, Zigbee wireless communication technology is implemented. Bluetooth wireless communication technology is used as an option for control interface expansibility. The redundancy of wired communication and wireless communications increases the probability that BDS will be shut off when commanded.

Figure 7:
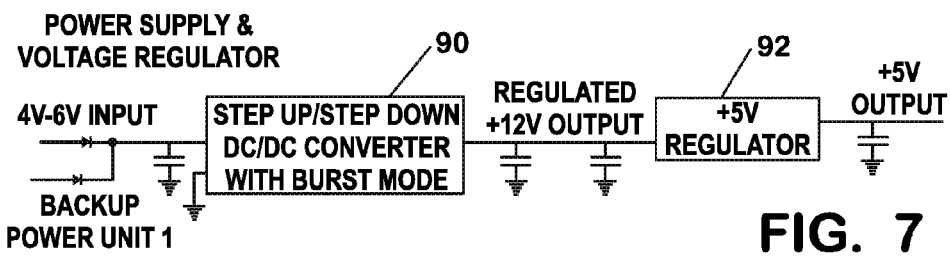
FIGS. 7 and 8 collectively form a schematic diagram of the power supply and voltage regulator used in the circuits of FIGS. 1 and 6.

FIG. 7 illustrates details of the power supply and voltage regulator 50. A step up/step down DC/DC converter 90 with burst mode can develop regulated +12 VDC output from input voltages ranging from +4 VDC to +60 VDC. One input to converter 90 is from the battery bank through a diode. Another input is from the back-up power circuit 56. A voltage regulator 92 develops +5 VDC for the microcontroller system from the output of converter 90.

Figure 8:
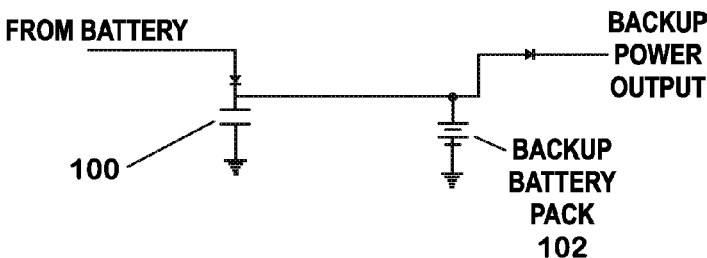

FIG. 8 illustrates back-up power circuit 56. It comprises a super-capacitor 100 and a back-up battery pack 102. The super-capacitor 100 is charged from the battery bank through a diode D7. Battery pack 102 parallels super-capacitor 100 and is kept charged from the battery bank.

Figure 9:
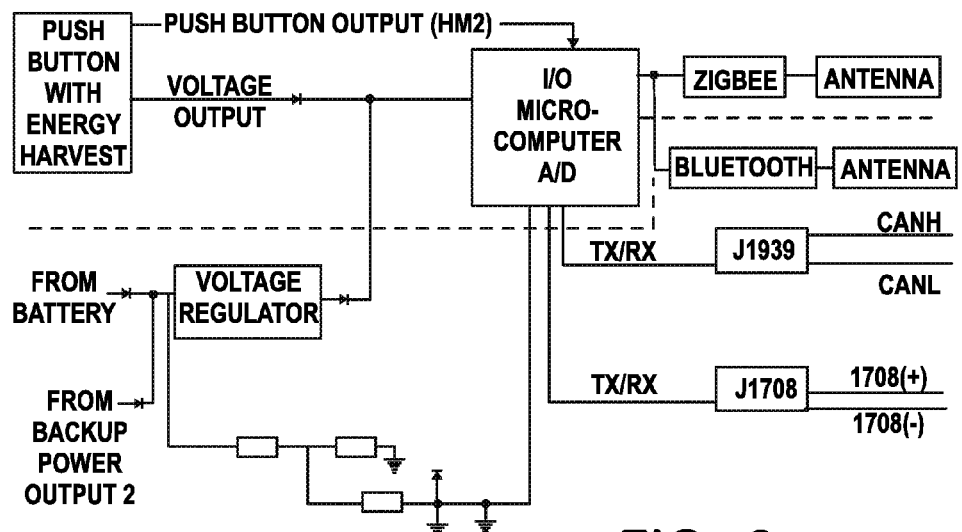
FIG. 9 is a more detailed schematic diagram of the second circuit shown in FIG. 2.

FIG. 9 shows control unit 34. A microcontroller 104 can read a user command from a push button with energy harvest module 106 and transmit the command to control unit 26 through wired and/or wireless channels. When the push button is pushed, the energy harvest module provides power to assure the microcontroller and Zigbee module both perform the user request. This enables control unit 34 to still send a command to control unit 26 should the power supply to the MHI interface and/or wired communication channel become non-functional, such as in an accident.

While a presently preferred embodiment of the invention has been illustrated and described, it should be appreciated that principles of the invention are applicable to all embodiments that fall within the scope of the following claims.

What is claimed is:

1. A motor vehicle comprising:
   an electrical system connected through a battery disconnect switch to a bank of one or more DC storage batteries;
   a battery disconnect switch controller for opening the battery disconnect switch in response to a command to disconnect the battery bank from the electrical system;
   redundant channels of communication through which the command is transmitted from one or more sources of the command to the controller, wherein the controller is electrically powered by the battery bank, and further including a back-up source of DC voltage that is kept sufficiently charged by a connection to the battery bank to provide enough electrical power to the controller to enable the controller to operate the disconnect switch if battery bank power is lost to the controller.

2. A motor vehicle as set forth in claim 1 wherein the back-up source of DC voltage comprises the combination of a capacitor and a back-up battery in parallel with each other, the combination is kept charged by the battery bank via a connection containing a diode, and combination is coupled to the controller via another connection containing another diode.

3. A motor vehicle as set forth in claim 1 wherein the disconnect switch comprises an actuator, the back-up source of DC voltage is connected through a diode to an actuator of the disconnect switch, and the battery bank is connected through a diode to the actuator.

4. A motor vehicle as set forth in claim 1 further including a power supply and regulator for supplying regulated voltages of different levels, one voltage level being supplied to a microcontroller that processes commands from the redundant channels of communication to open the disconnect switch and another voltage level being supplied to the disconnect switch.

5. A motor vehicle as set forth in claim 4 wherein the power supply and regulator comprises a DC-to-DC converter that outputs the voltage level supplied to the disconnect switch and including a further regulator that has an input receiving the voltage level output of the DC-to-DC converter and an output that provides the voltage level supplied to the microcontroller.

6. A motor vehicle as set forth in claim 5 wherein the DC-to-DC converter comprises an input that is coupled via a diode with the battery bank and also coupled via another diode with a back-up source of DC voltage that is kept sufficiently charged by a connection to the battery bank to provide enough electrical power to the controller to enable the controller to operate the disconnect switch if battery bank power is lost to the controller.

7. A motor vehicle as set forth in claim 1 wherein a hard-wired trigger circuit couples the controller to an actuator of the disconnect switch, and the redundant channels of communication are inputs to the controller.

8. A motor vehicle as set forth in claim 7 wherein the redundant channels of communication comprise an HMI at the controller, a wireless channel to the controller from the one or more sources, and a hard-wired channel to the controller from the one or more sources.

9. A motor vehicle as set forth in claim 8 wherein the HMI at the controller comprises a pushbutton.

* * * * *